(12) United States Patent
Laverty

(10) Patent No.: US 6,865,033 B2
(45) Date of Patent: Mar. 8, 2005

(54) LENTICULAR DISPLAY DEVICE

(76) Inventor: Owen Laverty, 2 Royal Ct., Bow Lane West, Dublin 8 (IE)

( * ) Notice: Subject to any disclaimer, the term of this patent is extended or adjusted under 35 U.S.C. 154(b) by 0 days.

(21) Appl. No.: 10/473,650

(22) PCT Filed: Apr. 23, 2002

(86) PCT No.: PCT/IE02/00052
§ 371 (c)(1),
(2), (4) Date: Sep. 29, 2003

(87) PCT Pub. No.: WO02/086589
PCT Pub. Date: Oct. 31, 2002

(65) Prior Publication Data
US 2004/0120048 A1 Jun. 24, 2004

(30) Foreign Application Priority Data

Apr. 24, 2001 (IE) .......................... S2001/0404
May 17, 2001 (IE) .......................... S2001/0480

(51) Int. Cl.[7] .............................. G02B 7/02
(52) U.S. Cl. ..................... 359/819; 359/619; 359/811
(58) Field of Search ................. 359/619, 621, 359/811–815, 818, 819, 827, 829; 349/57, 95

(56) References Cited

U.S. PATENT DOCUMENTS

| | | | |
|---|---|---|---|
| 6,384,980 B1 * | 5/2002 | McKinley | 359/619 |
| 2002/0085287 A1 * | 7/2002 | Egawa | 359/619 |
| 2004/0074121 A1 * | 4/2004 | Bar-Yona | 40/454 |

\* cited by examiner

*Primary Examiner*—Huy Mai
(74) *Attorney, Agent, or Firm*—Daly, Crowley & Mofford, LLP

(57) ABSTRACT

A lenticular display device comprises a back panel 2 having a major surface 15 with a substantially fixed curvature. A front panel 4 is substantially in register with the back panel and is releasably pressed against and into conformity with the major surface 15 by cams 11 which apply oppositely-directed tangential forces at the edges of the front panel. An image sheet 20 and lenticular lens 21 are sandwiched between the two panels, the lens being maintained in intimate contact with substantially the entire area of the image sheet by the panels. In another embodiment the front panel is omitted and the lens itself serves as the front panel.

7 Claims, 22 Drawing Sheets

LENTICULAR DISPLAY DEVICE

CROSS-REFERENCE TO RELATED APPLICATIONS

This application is a National Stage application of PCT Application No. PCT/IE02/00052, filed on Apr. 23, 2002, and claims the benefit of IE Application No. S2001/0404, filed on Apr. 24, 2001, and also claims the benefit of IE Application No. S2001/0480, filed on May 17, 2001.

The present invention relates to a display device, and in particular, to a device for displaying a removable image through a lenticular lens.

Typically, a lenticular lens is mounted in a light box or in a framework without a light box. A sheet of paper or other suitable medium having two or more interlaced images printed thereon is laminated to the back of the lenticular lens. Accordingly, when the images are viewed through the lenticular lens depending on the angle at which the subject is to the lens one or other of the images is visible. As the subject moves position relative to the device the image viewed repeatedly changes from one image to the other. When the lenticular lens is mounted in a light box the interlaced images printed on the lenticular lens are translucent and light passes from the rear through the image and lens for illuminating the image. When a light box is not provided the image is illuminated from the viewing side through the lenticular lens, and the interlaced images are opaque.

Lenticular lenses have a series of lenslets which have a focal point on the rear flat side of the lens. Therefore the lenses are designed to have the image firmly adhered to the rear of the lens. A gap between the lens and the image will result in the image being out of focus resulting in increased ghosting or crosstalk, the larger the gap the more ghosting. It is therefore important to have intimate contact between the lens and image for high quality images. To date the most commonly known methods of achieving this are by adhering the image to the lens, which is expensive and time consuming, or by direct printing which requires expert knowledge.

Lenticular displays have many advantages; for example, they permit two or more images to be displayed from the one site simultaneously, and additionally they allow the display of images in three dimensions, for example, by displaying a foreground, middle ground and distant ground. However, if a large or fine lenticular image is required the image has to be permanently laminated or printed to the rear of the lens which results in a new lens being required for every image change, the laminating of the images generally requiring expensive expertise and equipment.

Existing devices for replacably mounting an image behind a lenticular screen and movable displays are known. Patents GB2206227, U.S. Pat. No. 5,146,703 and GB2308005 describe such devices. These devices have limited use as they do not allow for large images to be viewed nor do they allow for high resolution images to be viewed at any significant size. They are also bulky and expensive to manufacture. These attempts rely on tightly sandwiching the image and lens between two planar members, so as to maximise the contact between the rear of the lens and the image, this method requires the use of thick rigid transparent glass or plastic in front of the lens, extremely rigid surface behind the image and many fixings to provide the required clamping force. The lens required for this method is generally a thick, coarse pitched, expensive lens which is more forgiving with air gaps. The reason for this is that as an air gap behind a thick lens would result in a smaller percentage error on the position of the image with respect to the focal point of the lens than a thin lens with the same size air gap, thick lenses therefore reduce the negative effect of any gaps between the lens and image. This clamping method is of limited success as it is impossible to completely eliminate gaps between image and lens without using impracticably thick sandwiching members and very high clamping forces, the problem being accentuated as the image size and therefore the surface area increases so that any image over typically over A3 is not of acceptable standard. The thickness of the sandwiching members is such so as to render such a device expensive, heavy and impractical. A company called Benchmark Imaging in the U.S.A. have a product which employs a vacuum between a front and rear panel to hold the image and lens into close contact. A camming mechanism moves the image and lens relative to each other. This system is supplied with an image and does not allow for changing of the image by a casual user. It is also limited to a lens pitch of 15 lpi which is coarse and its maximum size is 4 feet×4 feet. A major disadvantage is that the image has to be changed in the factory, therefore making it impractical for sites which need regular updating.

There is therefore a need for a display device, which is not limited in display size or lens pitch for displaying stationary and moving lenticular images and which allows for a lenticular lens to be reused indefinitely. There is also a need for such a device which allows for quick and easy changing of the images as required by an unskilled operator.

The present invention is directed towards providing such a device.

According to the invention there is provided a display device comprising a first panel having a major surface with a substantially fixed curvature, a second panel substantially in register with the first panel and releasably pressed against and into conformity with the said major surface by means applying oppositely-directed tangential forces at the edges of the second panel, and an image sheet sandwiched between the first and second panels, wherein either the device includes a lenticular lens also sandwiched between the panels next to the image sheet or one of the panels is itself a lenticular lens, in either case the lens being maintained in intimate contact with substantially the entire area of the image sheet.

The invention will be more clearly understood from the following description of embodiments thereof which are given by way of example only with reference to the accompanying drawings in which.

Figure 1:
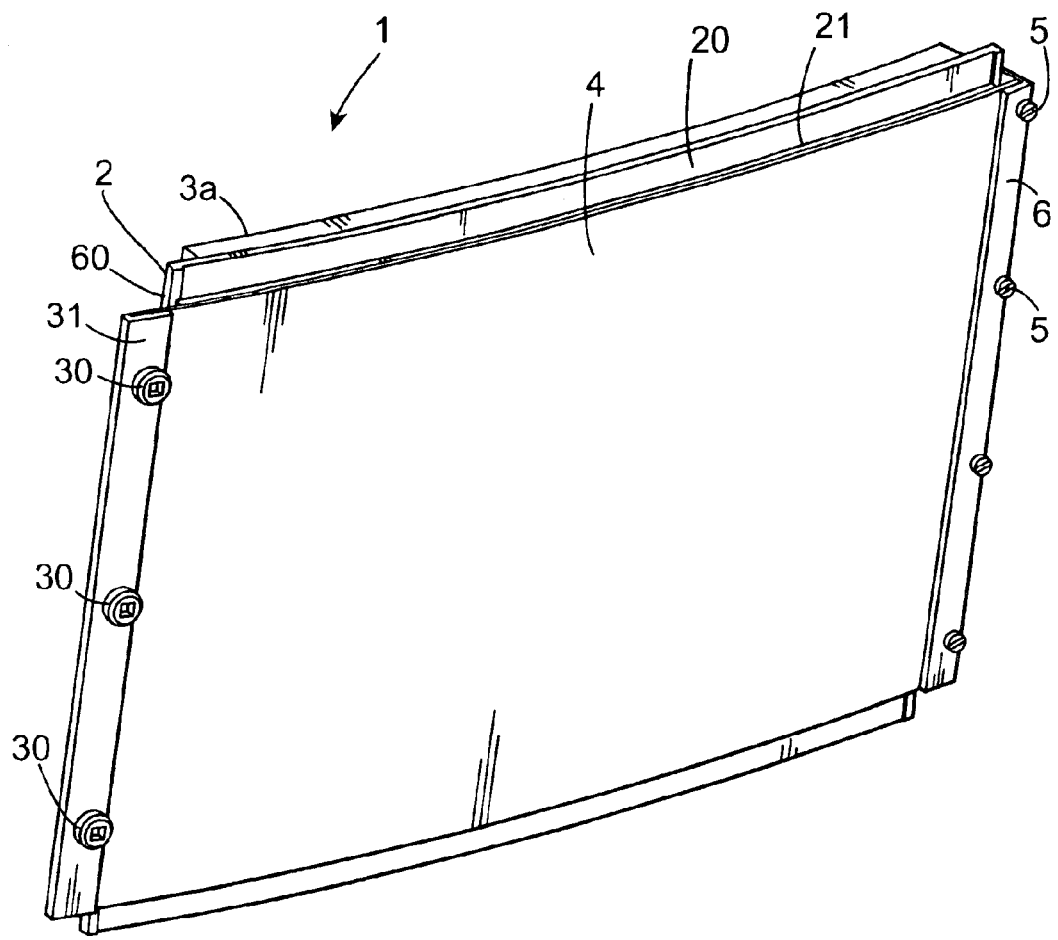
FIG. 1 is a perspective view a device according to the invention.

Referring to the drawings and initially to FIGS. 1 to 5 there is illustrated a lenticular display device according to a first embodiment of the invention indicated generally by the reference numeral 1. The device 1 comprises a rectangular back panel 2 of semi-rigid material attached to rigid, curved members 3a and 3b by bolts not shown, thus presenting a major surface 15 which is convex in a plane normal to the opposite parallel side edges 8, 60 of the back panel. Although the back panel 2 per se is semi-rigid, the rigid members 3a, 3b maintain the curvature of the back panel substantially fixed. A transparent, flexible rectangular front panel 4 is substantially in register with the back panel 2 and is secured at one edge by bolts 5 to a first, generally U-shaped cross-section retaining means 6. The first retaining means 6 has a channel 7, an internal surface 22 of which bears against the edge 8 of the back panel 2.

Located at the opposite edge of the front panel 4 is a further retaining means 9 which includes a series of rotary cams 11 with retaining flanges 40, the cams 11 being used to tension the front panel 4 across the back panel 2 as will be described. The cams 11 are mounted to the front panel 4 using bolts 30 and are rotatable about axes normal to the panel 4. The cams 11 have generally egg-shaped cam surfaces which bear upon the edge 60 of the back panel 2, each cam surface having diametrically opposite cam surface regions 12 and 13 respectively further and nearer to the cam axis. The retaining flange 40 engages the rear surface 14 of the back panel 2 thus retaining the front panel 4 a set distance from the back panel 2. The retaining means 6 also has a series of bolts 16 in threaded holes 17 located in the outside wall 42 of the retaining means 6, the bolts 16 engaging with the edge 8 of the back panel 2. The position of the bolts 16 further determines the tension in the front panel 4, as will be described.

Sandwiched between the back panel 2 and the front panel 4 are an image sheet 20 and a lenticular lens 21. The image sheet 20 is against the convex surface 15 of the back panel 2 with its printed surface being viewable through the front panel 4. The lens 21 is positioned with its flat surface 50 against the image sheet 20 and behind the front panel 4. The image sheet and lens are preferably of material with a similar thermal coefficient of expansion to allow for thermal expansion when used in outdoor areas. The lens, back panel and front panel are of semi-rigid material such as Perspex, polycarbonate or the like. The thickness of the materials are such so as to provide sufficient strength and rigidity so as to eliminate gaps as required and avoid excessive creep due to tension or compression.

The rotary position of the cams 11 is determined by the rotation of the bolts 30. The bolts 30 run through the retainer 9 and holes 51 in the front panel 4 thereby securing the cams 11 relative to the edge of the front panel 4. When the cams 11 are rotated to bring the surface regions 12 to bear against the edge 60 of the back panel 2 the front panel 4 is under maximum tension. It will be appreciated that such tension arises due to the opposite, mutually outwardly-directed tangential forces exerted on the front panel 4 by the retaining means 6 and 9 which are biased apart by the cams 11. In the position of maximum tension the lens 21 and image sheet 20 are tightly pressed between the back panel 2 and front panel 4 thus substantially eliminating gaps between the image sheet 20 and lens 21. The contact force between the lens 21 and image sheet 20 is such that the image sheet 20 and lens 21 are firmly pressed against each other so that the lens is maintained in intimate contact with substantially the entire area of the image sheet. Preferably the curve induced in the lens is of a constant radius. The radius is of such a value so as to preferably minimise the chord height of the device while still performing its function.

Figure 2:
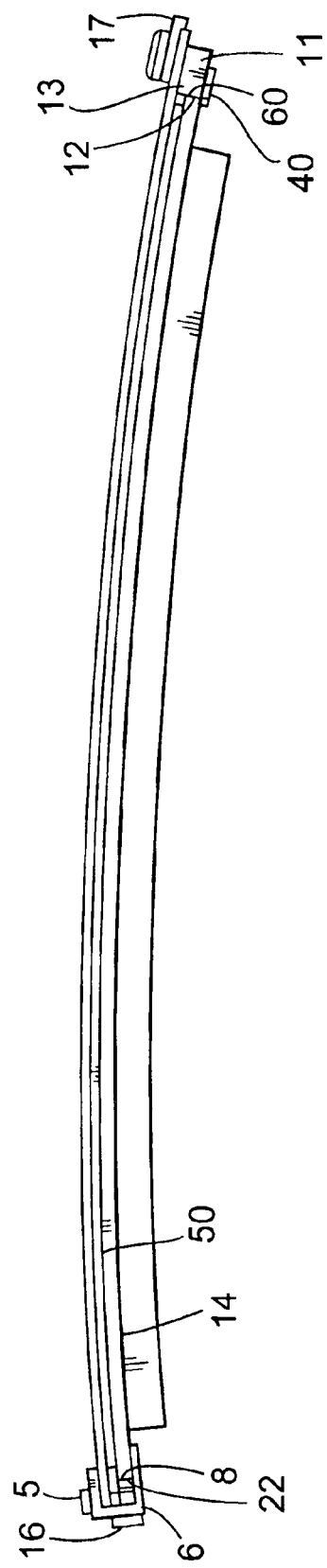
FIG. 2 is a end view of the device of FIG. 1 showing the curved shape of the device.
Figure 3:
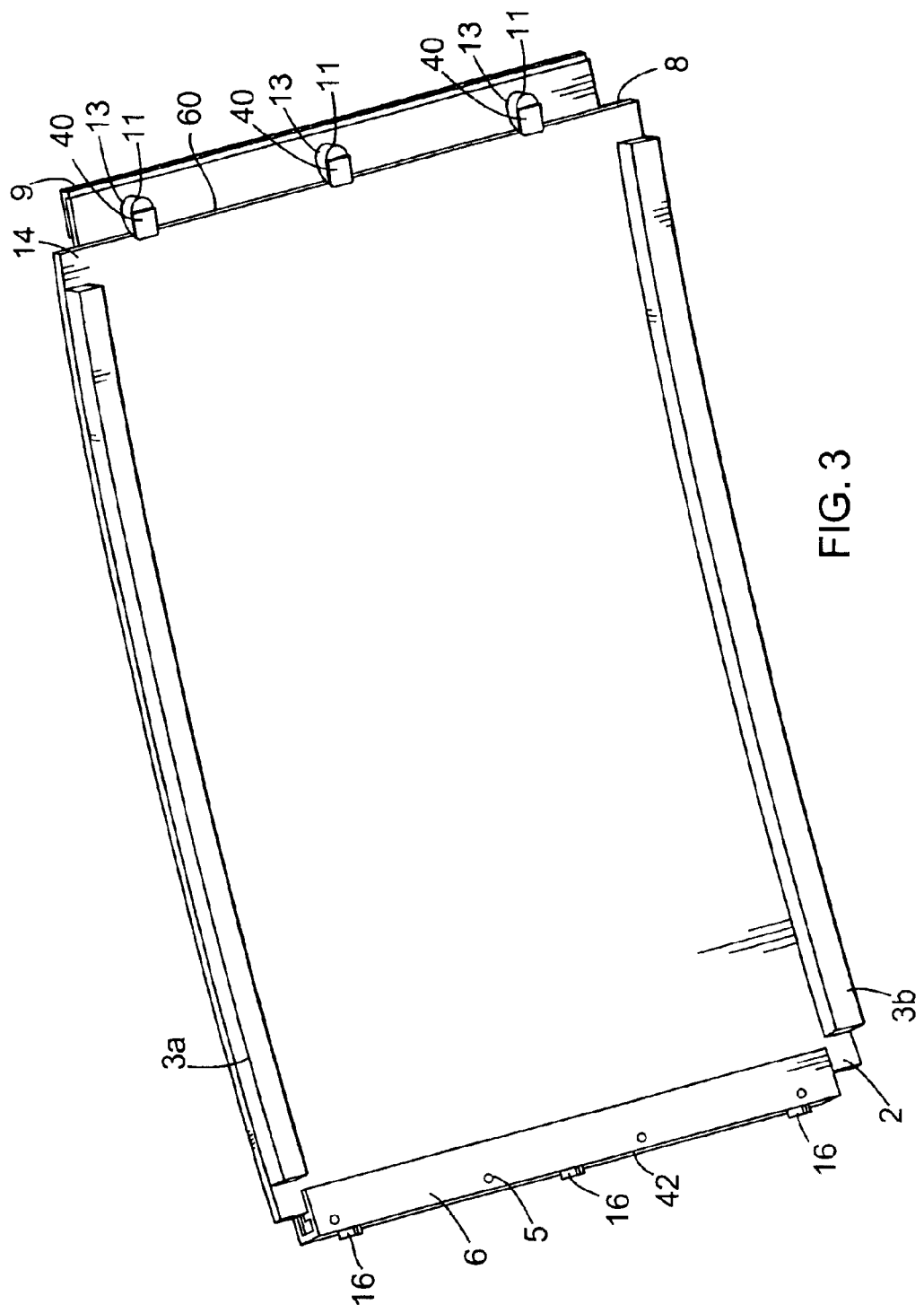
FIG. 3 is a rear view of FIG. 1 showing the tensioning and retaining means.
Figure 4:
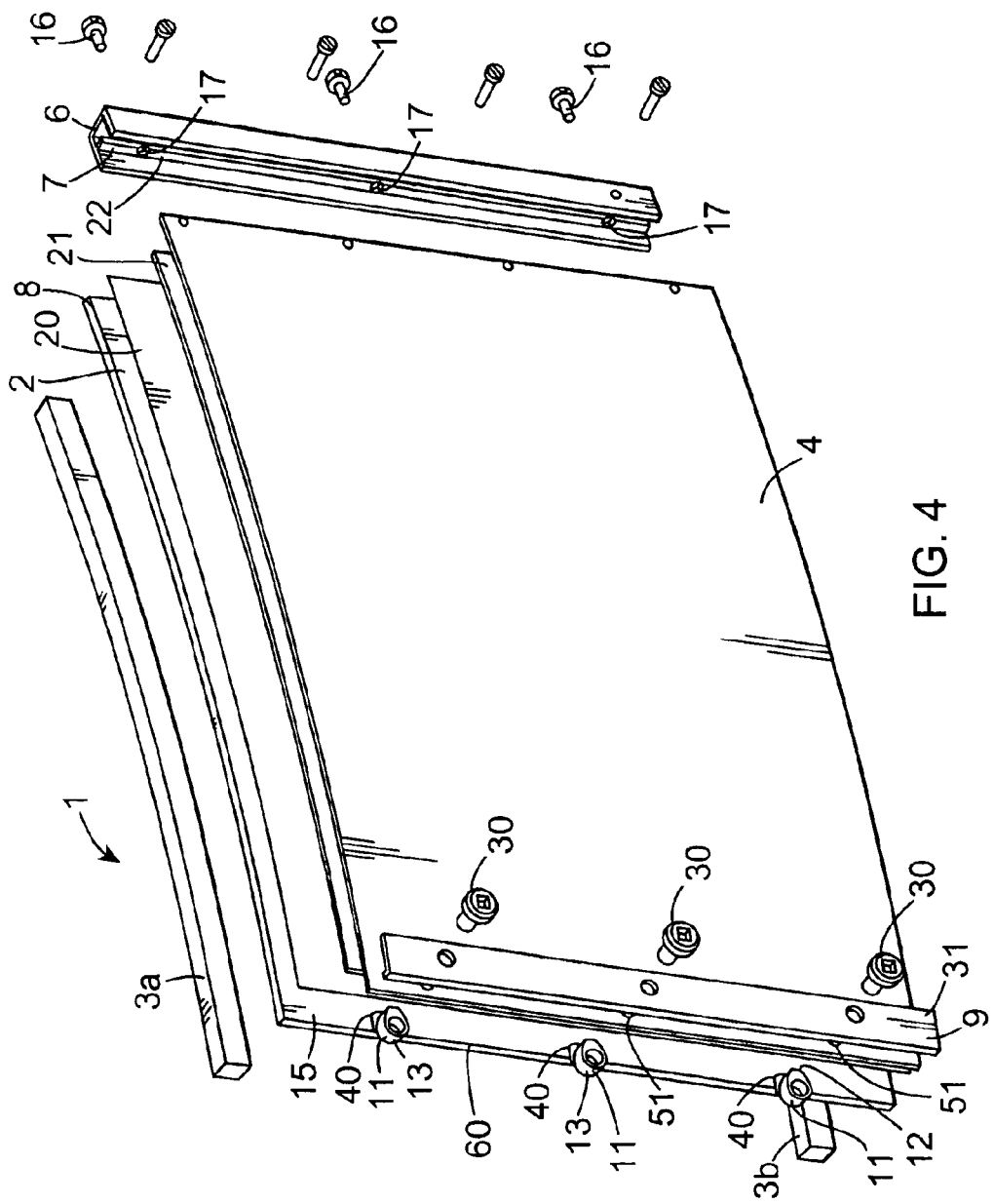
FIG. 4 is a exploded perspective view of FIG. 1.
Figure 5:
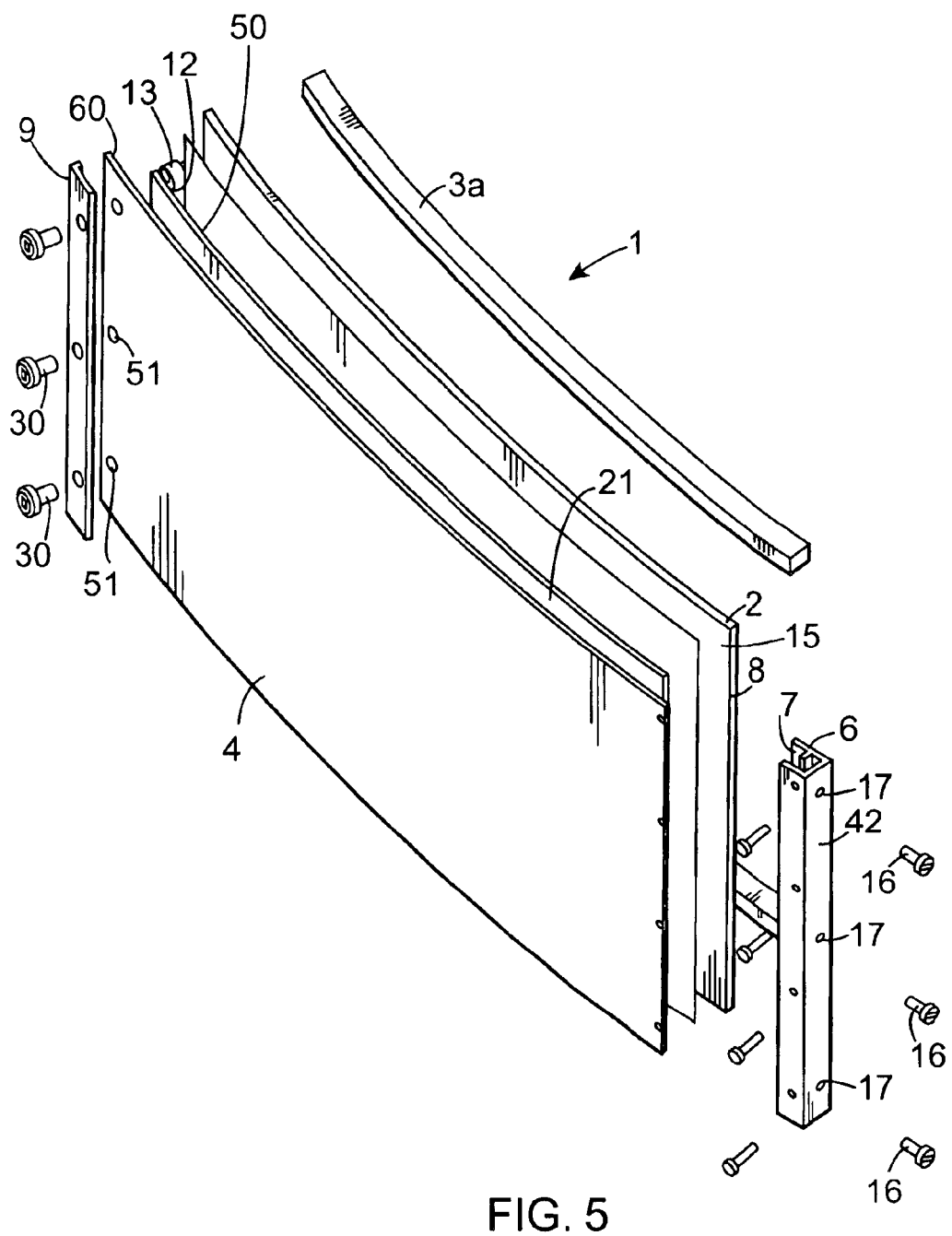
FIG. 5 is another exploded perspective view of the device of FIG. 1.

When the cams 11 are rotated so that the cam surface regions 12 are disengaged from the edge 60 the tension is reduced, the further the cams 11 are rotated from this position the less tension is present in the front panel 4. When the cams 11 are rotated so as to provide maximum tension as described above the retaining flange 40 of the cams 11 engage with the rear surface 14 of the back panel 2 thereby retaining the front panel 4 close to the back panel with a set gap between the front panel 4 and back panel 2. FIGS. 2 and 3 show the surface 12 of the cams 11 engaging with the edge 60 of the back panel 2.

In use, the cams 11 are rotated so as to remove the tension from the front panel 4, further rotating the cams 11 until the retaining flanges 40 are no longer in contact with the rear surface 14 of the back panel 2, releasing the front panel 4 and allowing a new image sheet 20 to be inserted between the lens 21 and back panel 2. Once inserted the front panel 4 is brought into close engagement with the lens 21 which is correspondingly brought into close abutment with the image sheet 20 which is effectively sandwiched between the front panel 4 and back panel 2. The cams 11 are then slightly rotated so as the surface 13 is in contact with the edge 60 of the back panel 2 and the flange 40 holds the front panel 4 in place against the lens 21. There is slight tension in the front panel 4 which allows the image sheet 20 and lens 21 to be aligned so as to provide proper lenticular functionality. Once proper alignment has been achieved the cams 11 are then fully rotated so that the cam surface 12 is in direct contact with the edge 60 of the back panel 2. The front panel 4 is therefore under high tension thus eliminating the gaps as described before, allowing for a high quality lenticular image. The tension in the front panel and stiffness in the back panel resulting in such pressure between the lens and image sheet that the image sheet remains stable when the front panel is firmly pressed on, the tension is also such that the image sheet 20 and lens 21 are securely held in place and will not move relative to each other under normal circumstances until the tension is removed. The image sheet is provided in conventional manner with two or more interlaced images which are viewable through the lenticular lens 21.

If the tension in the front panel 4 is inadequate for reasons of material creep in the front panel 4 over a period, its tension may be increased by tightening the screws 16 on the retaining means 6 or by means of tensioning springs (not shown). Stiffness is added to the free edges 8, 60 of the back panel 2 by the rigid retaining means 6 and 9 which help the back panel 2 to maintain a straight edge.

A second embodiment of the invention is shown in FIGS. 6 to 11. In this embodiment the cams 200 are mounted on the rear panel 2 and rotated so as to tension the front panel 4 through outwardly-directed tangential forces applied at its opposite edges. The cams have retaining flanges 205 which engage with the front surface 207 of the front panel 4 and hold it in close engagement with the lens 21. The free edges 208 of the back panel 2 have stiffening and spacing means 209 provided so as to control the straightness of the free edges 208 over their length and to ensure that the gap 210 between the front panel 4 and back panel 2 is the sum of the thickness of the image sheet 20 and lens 21 so as to ensure that when in tension the front panel 4 will engage the lens 21 over it's entire surface without the need for excessive tension. Ribs 300a and 300b create the curve for the back panel. The design of the ribs 300 allow the device 1 to have a minimised chord height.

Figure 6:
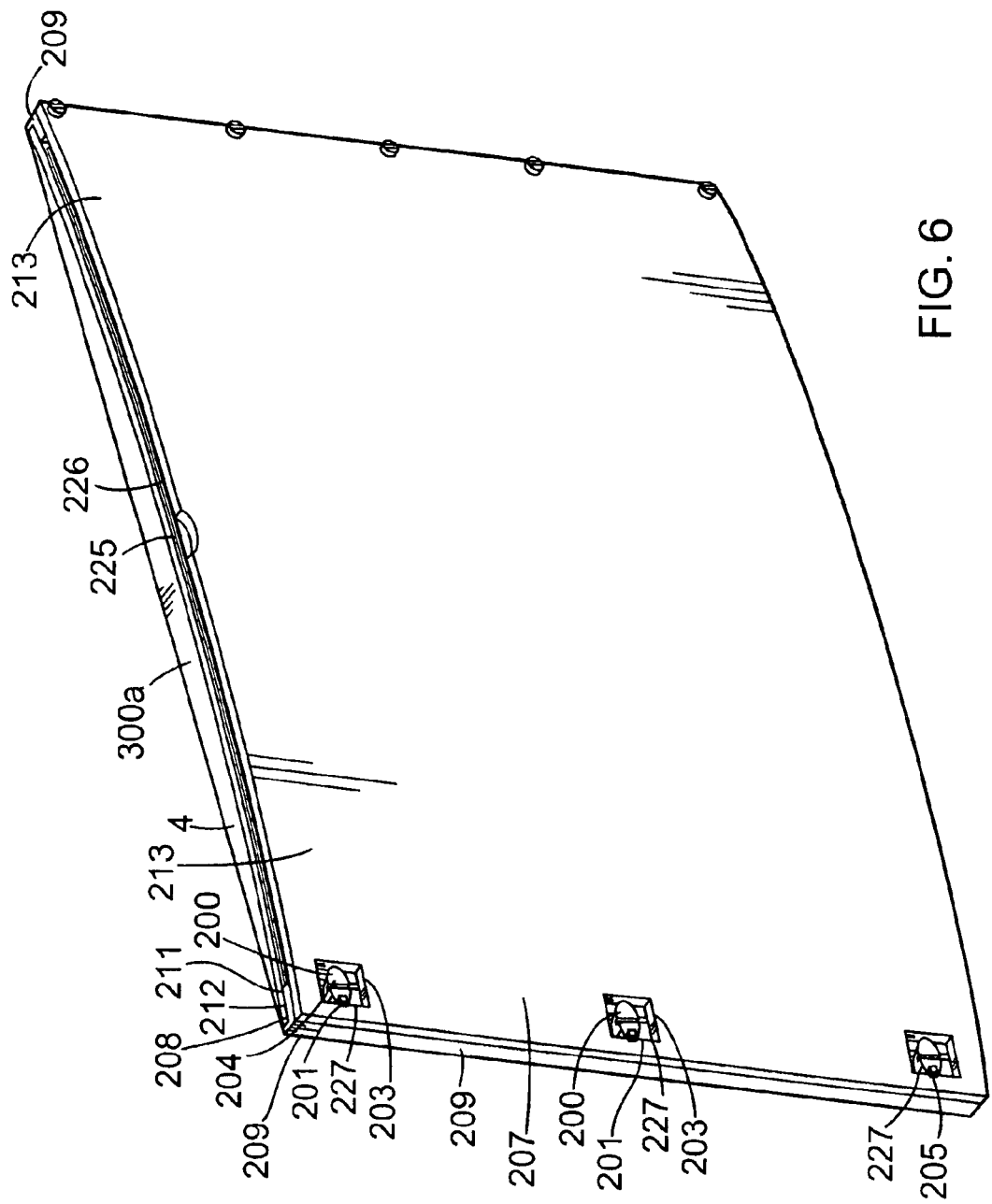
FIG. 6 is perspective view of a second embodiment of the device, with tensioning cams mounted onto the rear panel tensioning the front panel; a rib which does not increase the chord height is also shown.
Figure 7:
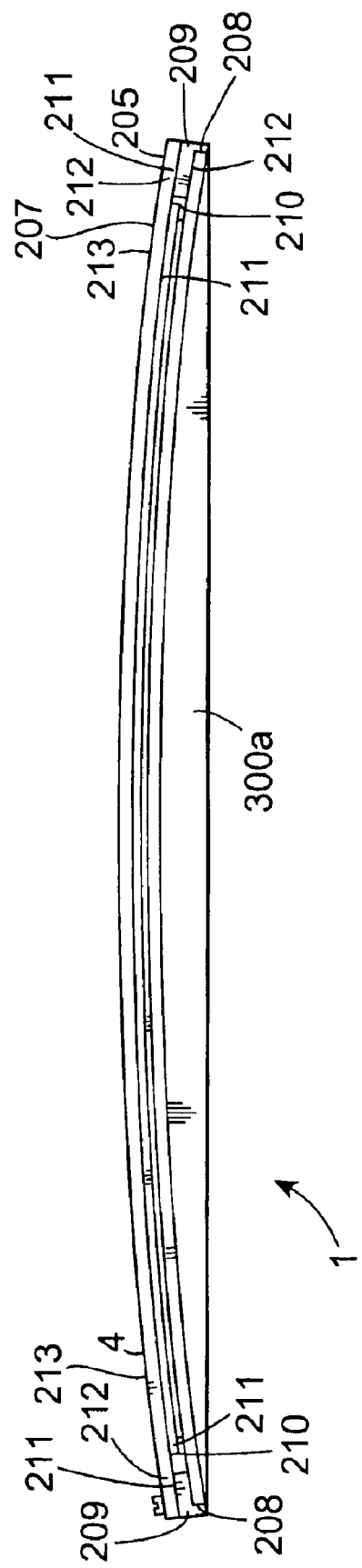
FIG. 7 is an end view of FIG. 6 showing the spacing means between the front panel and back panel.
Figure 8:
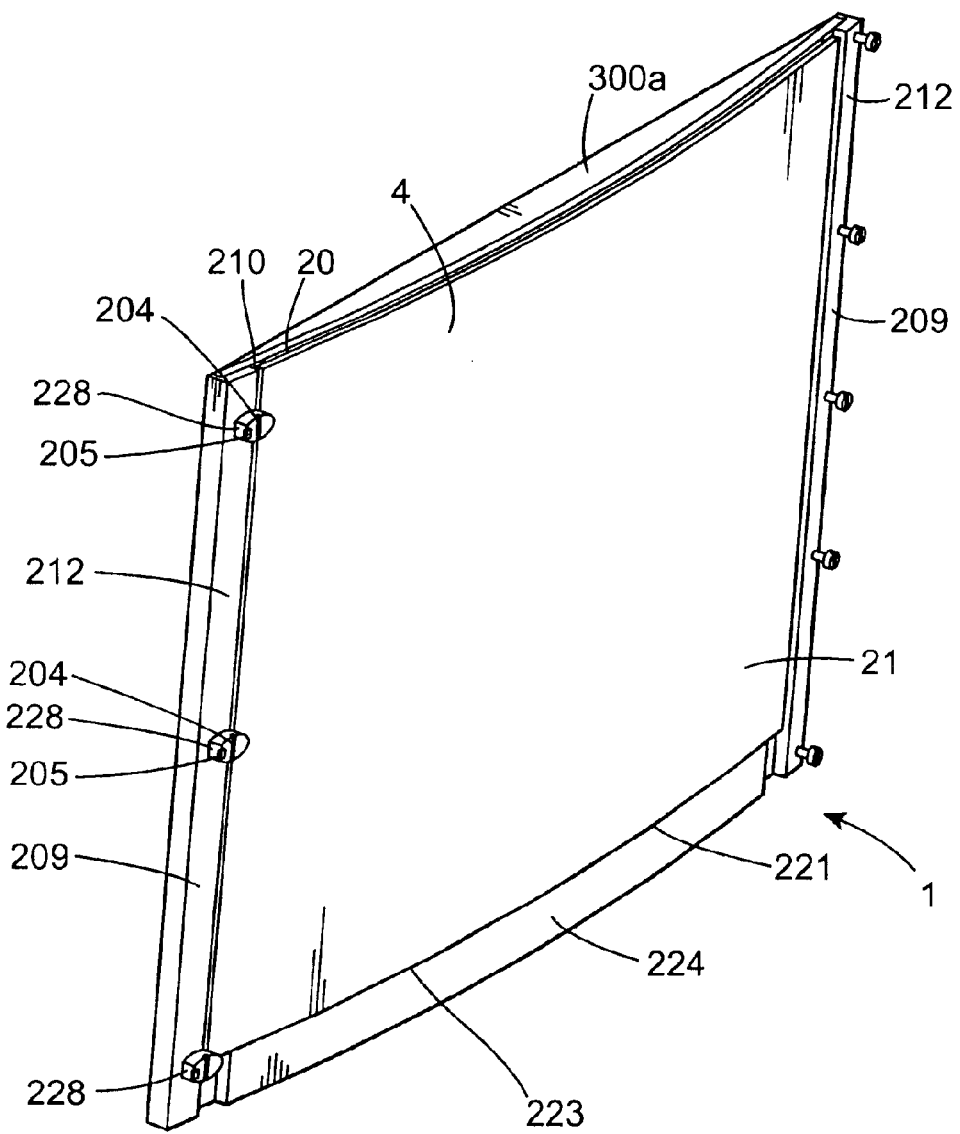
FIG. 8 is another perspective view of FIG. 6 with the front panel removed.
Figure 11:
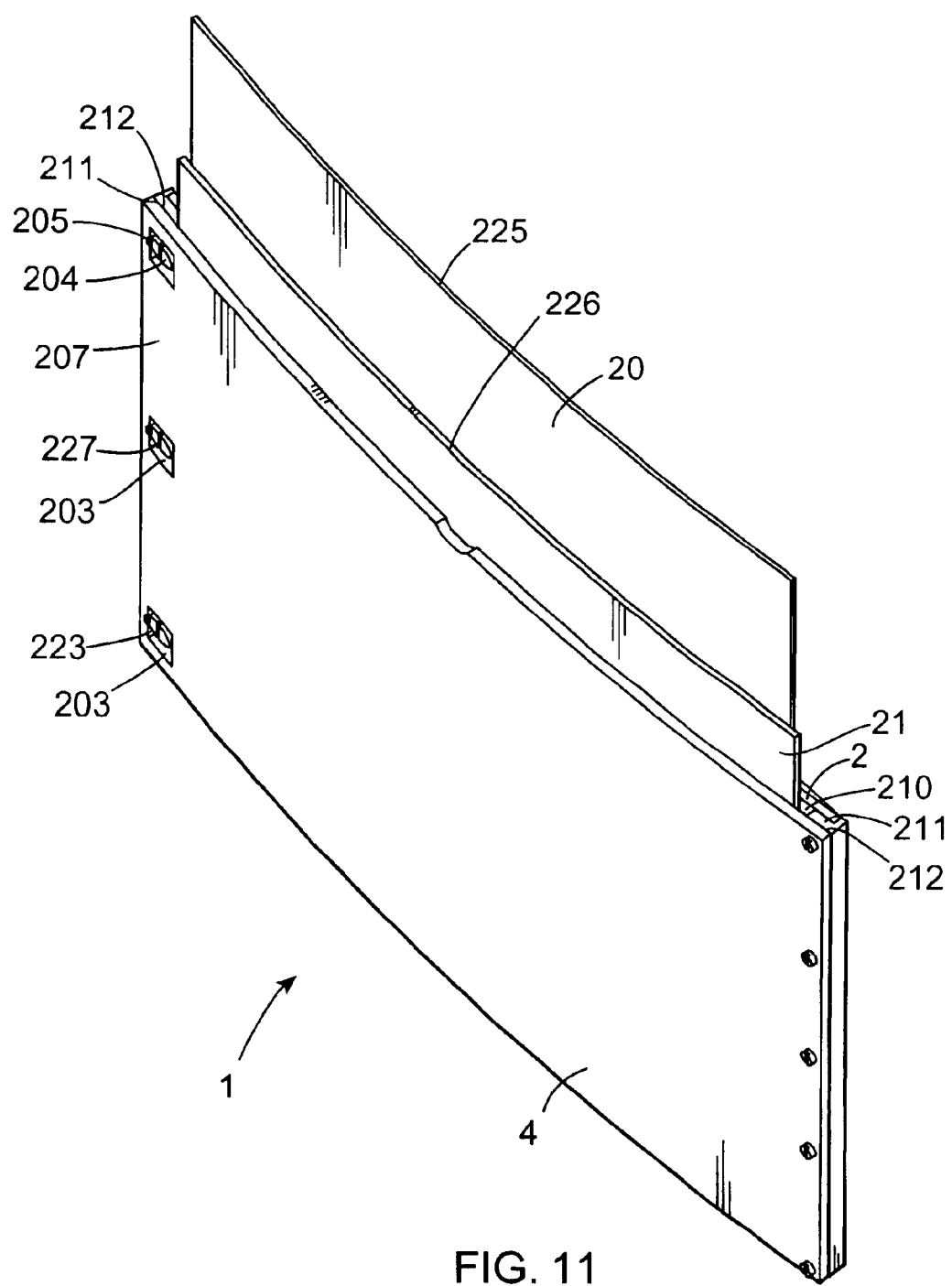
FIG. 11 is an exploded view of FIG. 6 showing the insertion of a new image sheet.

FIG. 6 shows the cams 200 engaged with the front panel 4. The cams 200 protrude through respective openings 203 in the front panel 4 near its edge and the camming surface 228 engages the surface 227 of the opening 203 when rotated so as to tension the front panel 4. The cams 200 have a slot 204 to allow them to be easily turned by screwdriver so as to engage and disengage with the front panel 4. Referring now to FIGS. 7, 8 and 11, when engaged the retaining flanges 205 retain the back surface 211 of the front panel 4 against the surface 212 of the spacing means 209, therefore maintaining the required gap 210. Should the gap 210 be greater or less than the cumulative thickness of the image sheet 20 and lens 21 the lens and image sheet would not have firm contact towards the sides 213 of the device, the area of the low contact are depending on the size of the gap 210.

Figure 9:
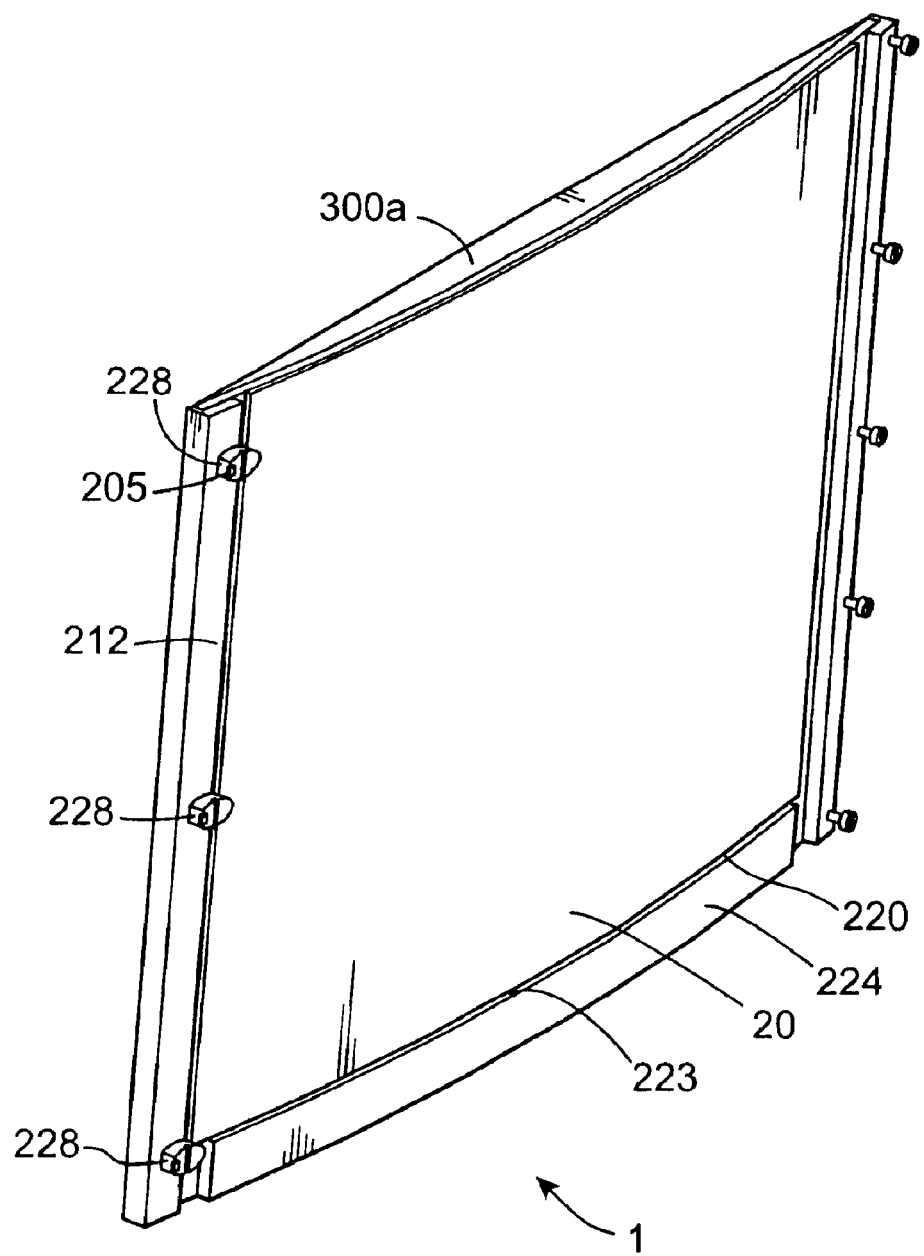
FIG. 9 is the same view as FIG. 8 with the lens removed.
Figure 10:
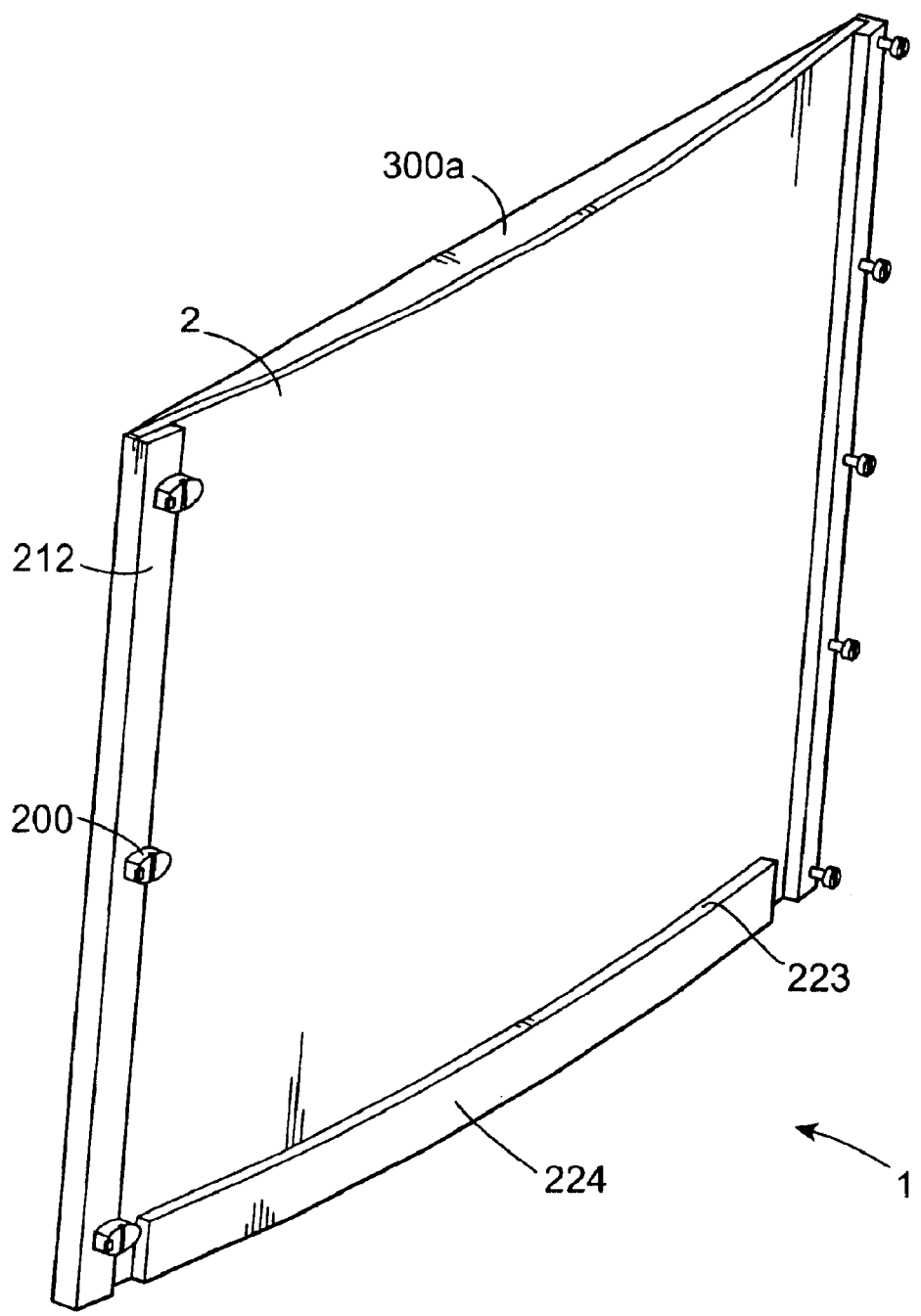
FIG. 10 is the same as FIG. 6 with the lens and image sheet removed.

FIG. 8. shows the image sheet 20 and lens 21 positioned relative to each other. The image sheet 20 has the interlaced image strips exactly perpendicular to the bottom edge 220 (FIG. 9) of the image sheet 20. The lens also has an edge 221 which is cut exactly perpendicular to the direction of the lenslets. The lens 21 and image sheet 20 are inserted between the front panel 4 and the back panel 2 with their corresponding edges 221 and 220 resting on the flat surface 223 provided by the rib 224 as shown in FIGS. 9 and 10.

In use the cams 200 are rotated to release the front panel 4. The image sheet 20 is replaced with a new image sheet which is placed as before between the lens 21 and back panel 2. The front panel 4 is then tensioned by rotating the cams 200 with a screwdriver so as to engage the cam surface 228 with the surface 227 of the opening 203 in the front panel 4. The top edges 225 and 226 of the corresponding image sheet 20 and lens 21 are pushed down so as to engage their opposite edges 220 and 221 with the flat surface 223 of the rib 224. With the edges 221, 220 and the surface 223 in contact the lens and image sheet are in perfect alignment.

Figure 12:
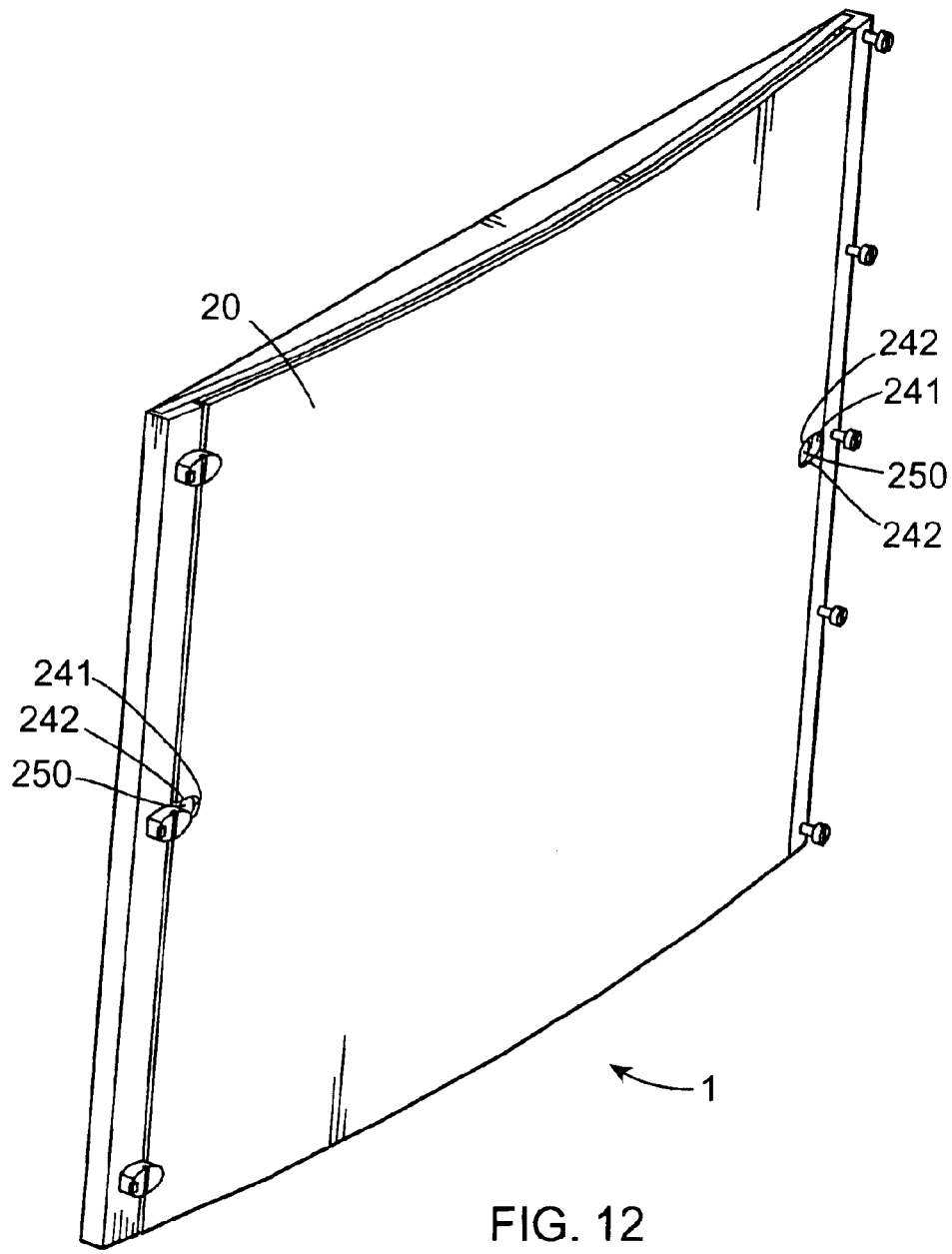
FIG. 12 is a perspective view of a third embodiment similar to the device of FIG. 6 but showing an alternative means for aligning the lens and image sheet with respect to each other, the front panel being removed.
Figure 12A:
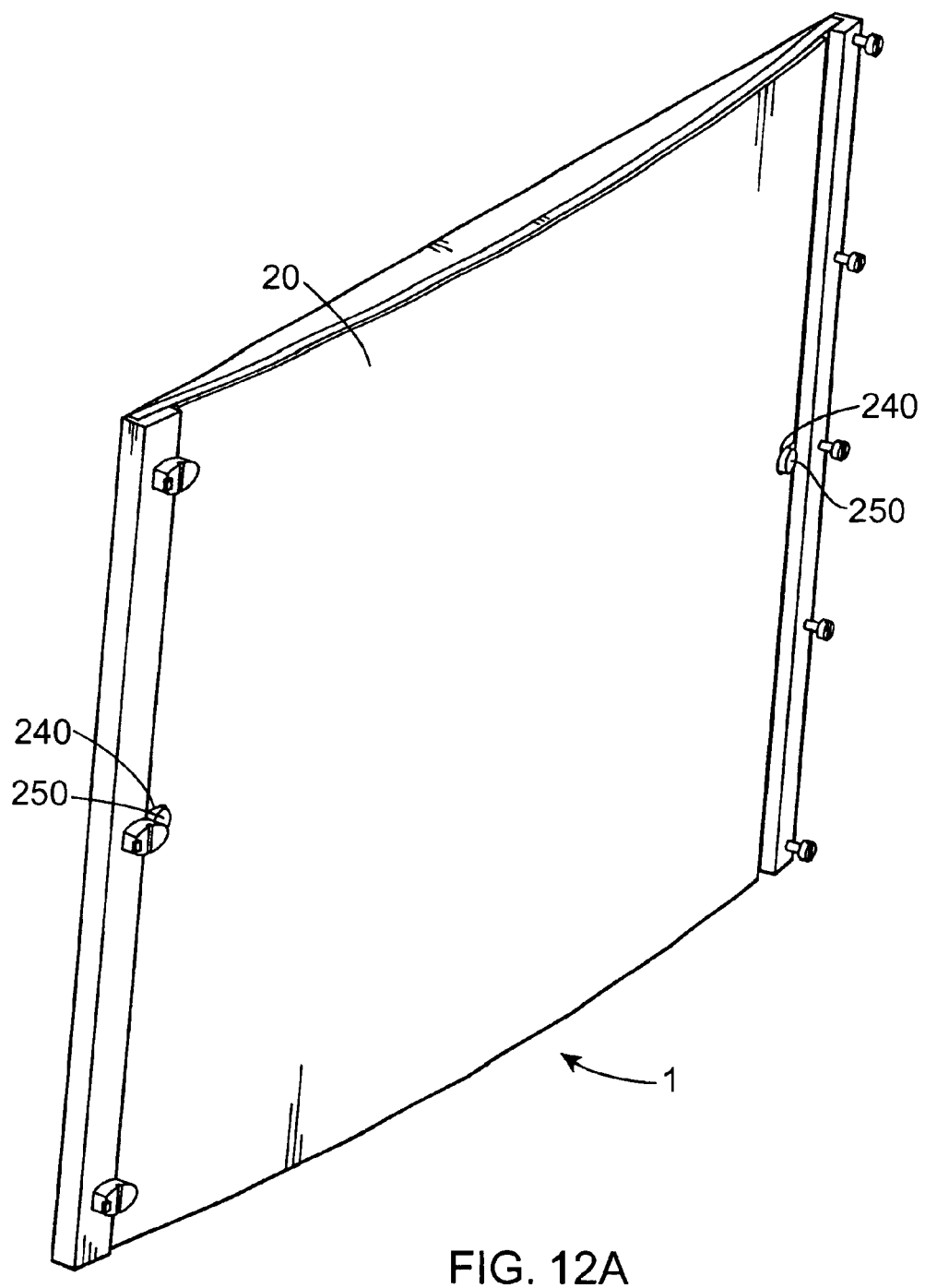
FIG. 12a is as FIG. 13 but with the lens removed.
Figure 13:
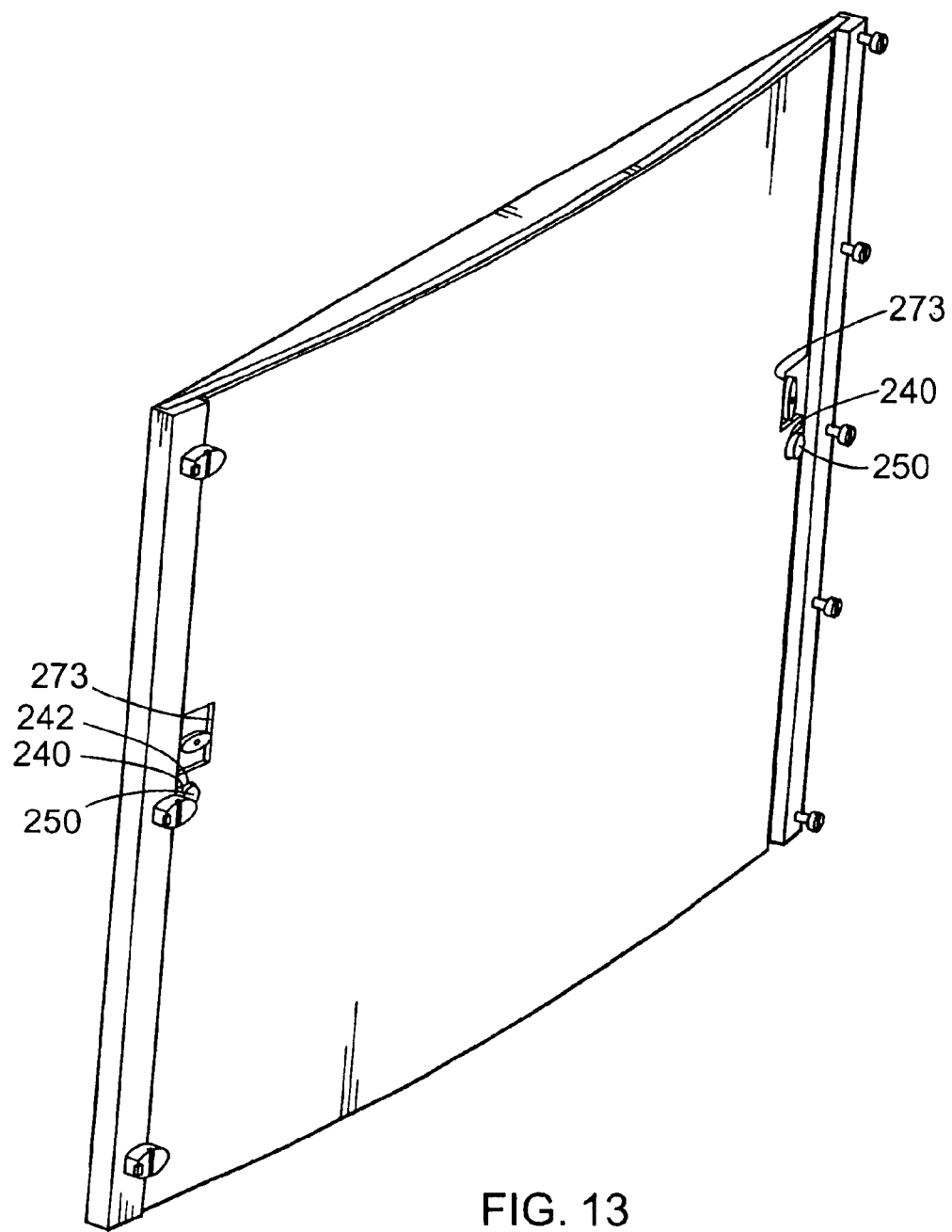
FIG. 13 is perspective view of a fourth embodiment of the invention where the image sheet is moved with respect to the lens with the front panel and lens removed.
Figure 14:
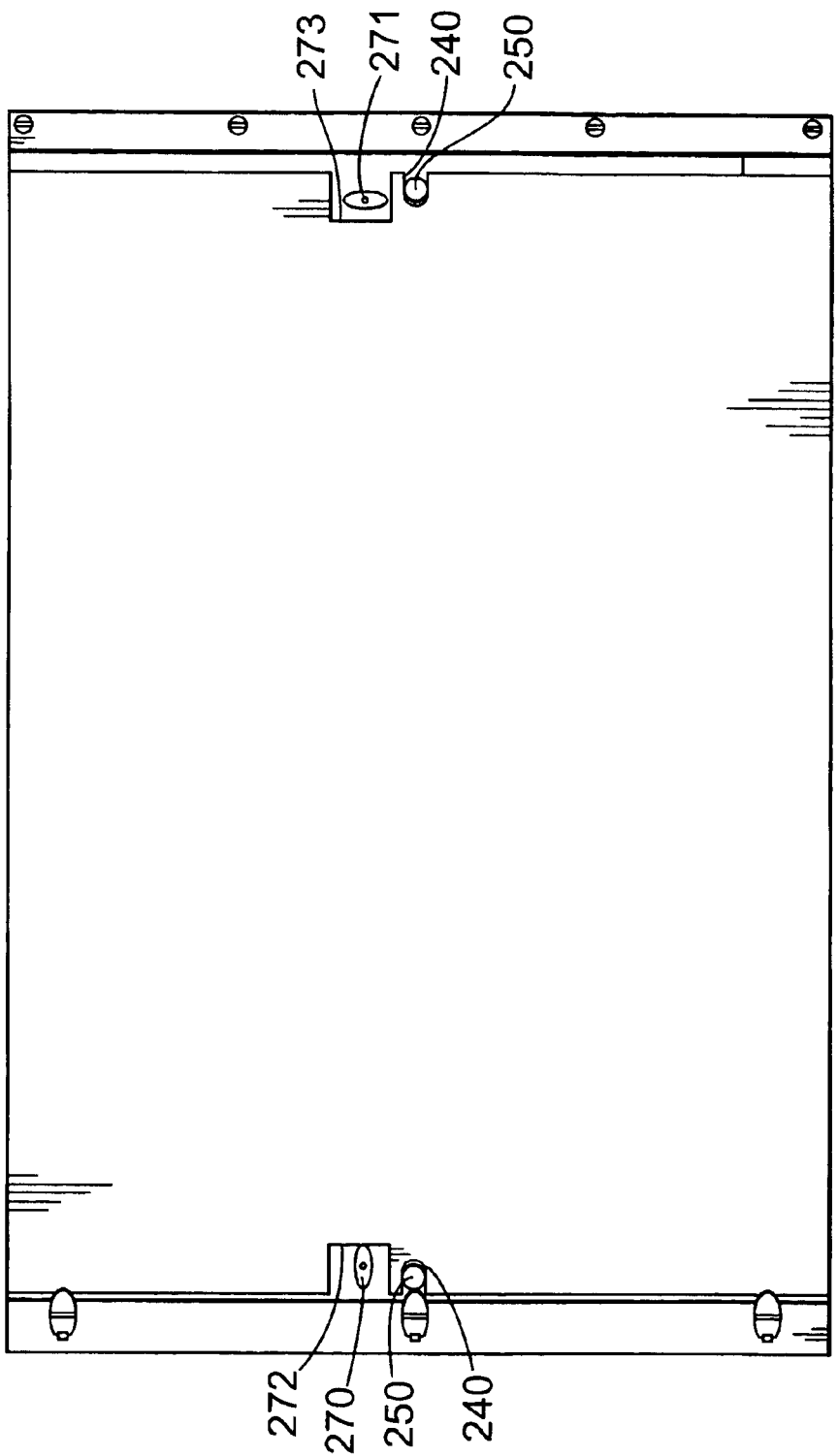
FIG. 14 is a plan view of FIG. 13.
Figure 15:
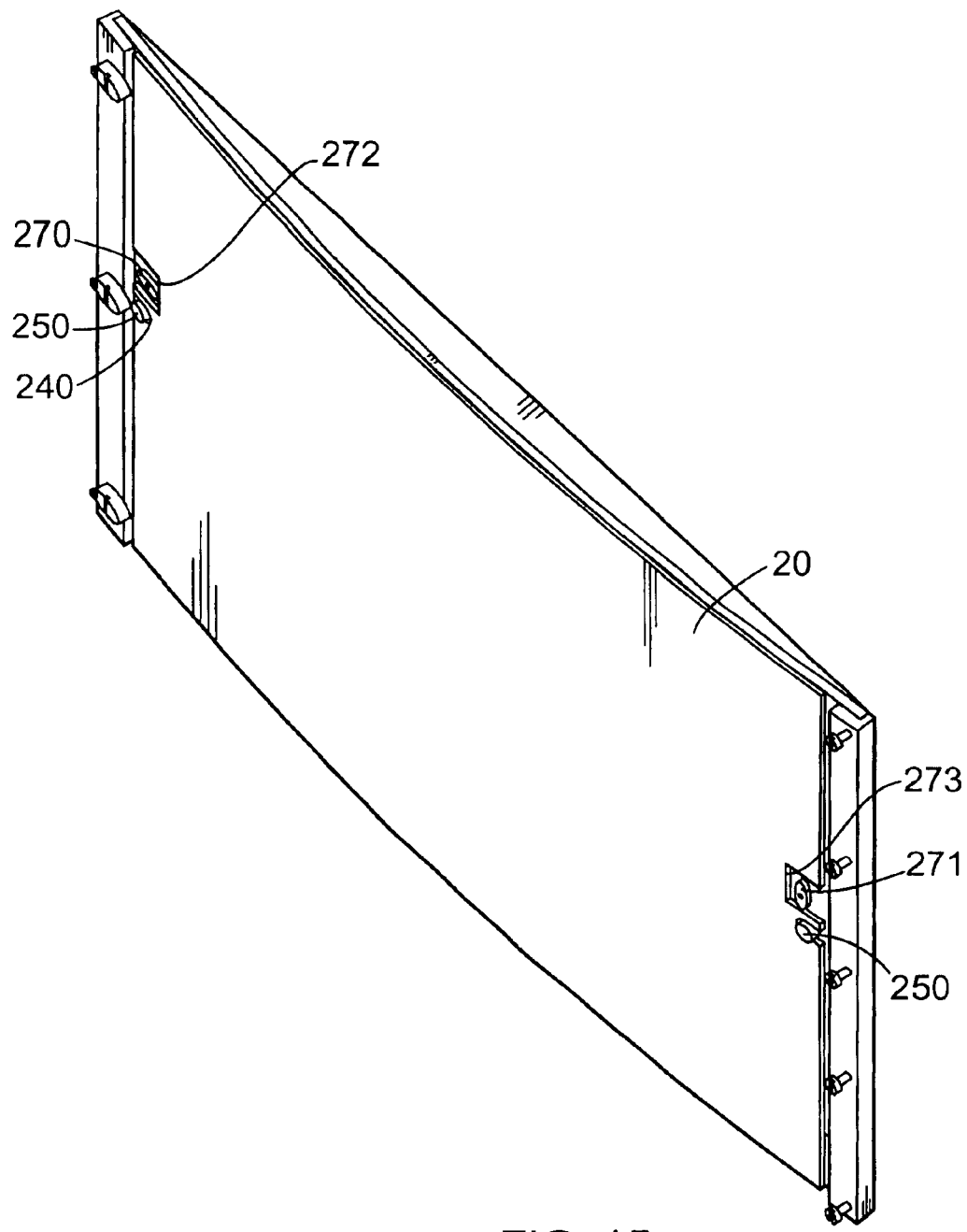
FIG. 15 is a perspective view of FIG. 13.

Referring now to FIGS. 12 and 12a, a third embodiment is essentially the same as the second embodiment but uses a different technique for aligning the image sheet 20 and lens 21. At each opposite side edge the image sheet 20 and lens 21 are provided with registering, elongated slots 240 and 241 respectively. The flat (elongated) edges 242 of the slots 240, 241 are perpendicular to the direction of the lenslets. Both the image sheet 20 and lens 21 are located on pins 250, each pin 250 being a nominal fit with a respective pair of registering slots 240, 241 so that the interlaced images and the lenticules remain parallel to each other while allowing for relative movement in a direction perpendicular to the lenslets. In use both image sheet 20 and lens 21 are inserted behind the front panel when the cams 200 are disengaged, the image sheet 20 and lens 21 are mounted on the pins 250 thus aligning the lens 21 and image sheet 20, the front panel 4 is then positioned so the cams 200 are protruding through the opening 203 on the front panel 4. The front panel 4 is then tensioned as before.

Either of these methods allow for simple installation of a new image sheet into the device ensuring correct alignment.

Figures 16, 16A:
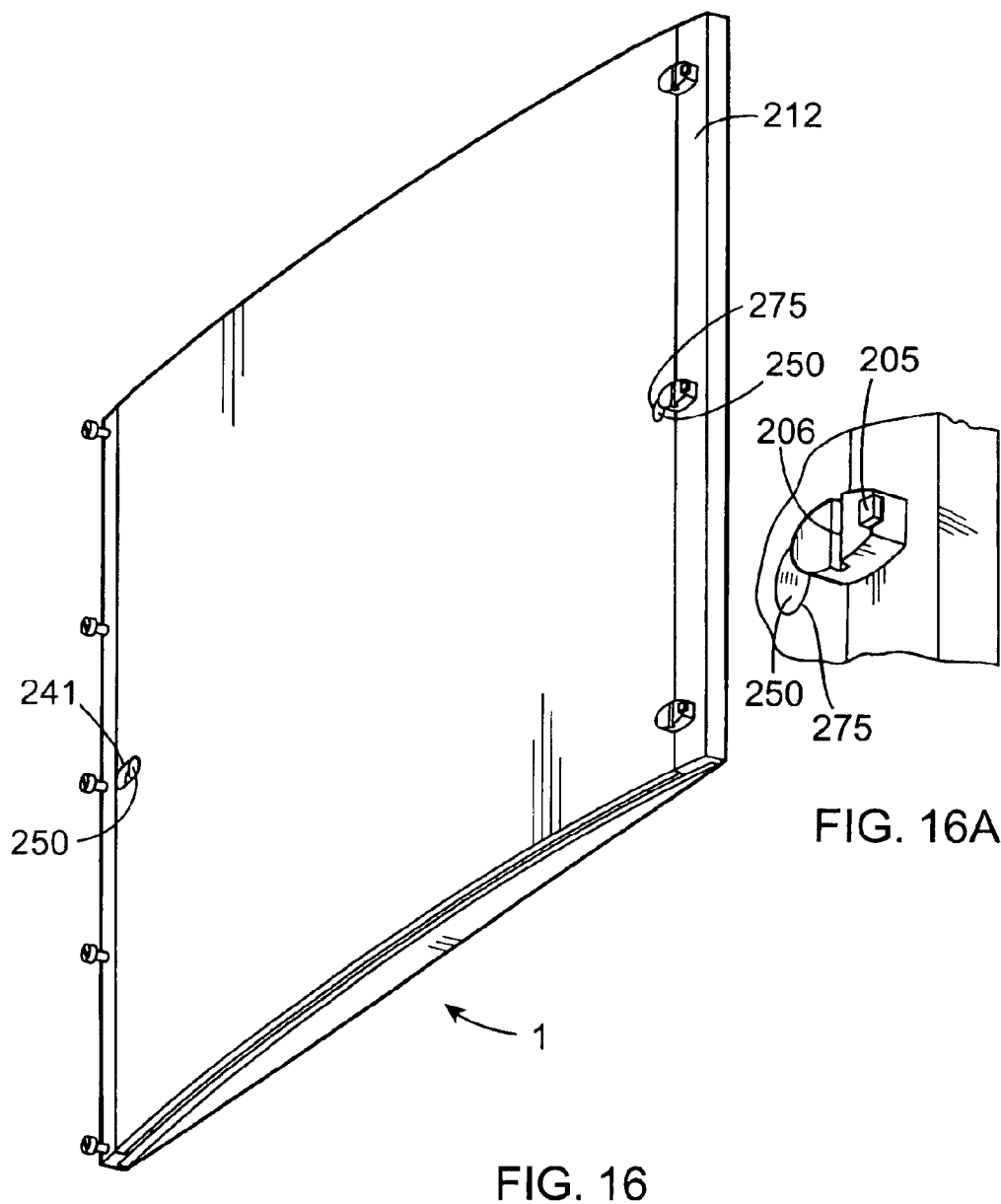
FIG. 16 is a view similar to FIG. 13 but including the lens.
FIG. 16a is a close-up of the cam and mounting arrangement of FIG. 16.
Figure 17:
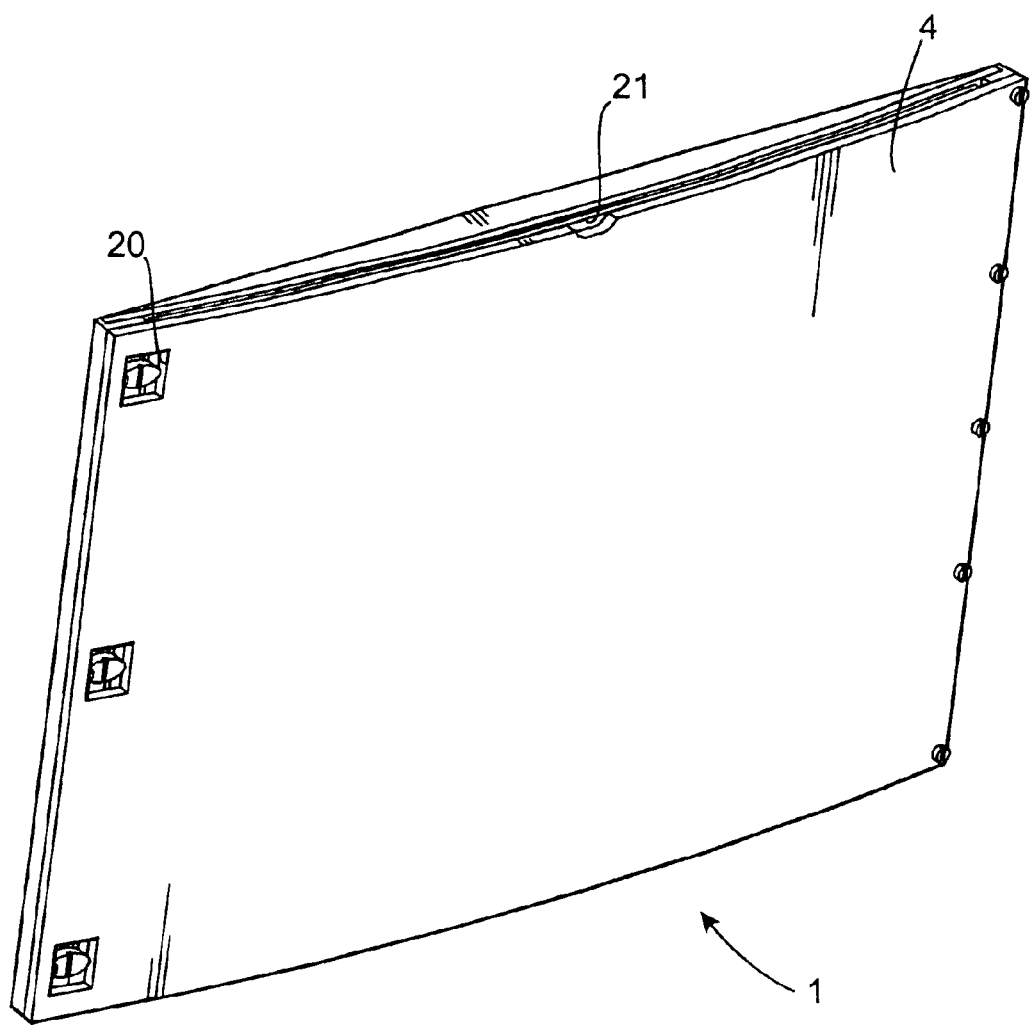
FIG. 17 is a perspective view of FIG. 13 with the front panel and lens in position.
Figure 17A:
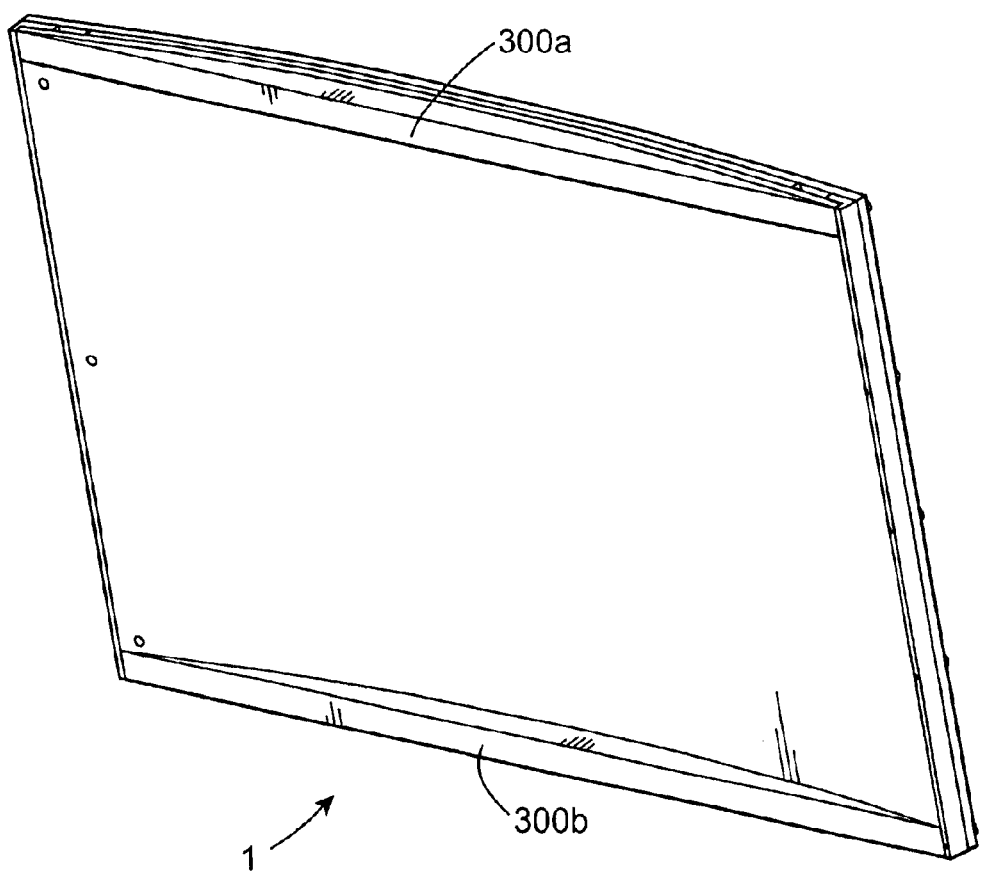
FIG. 17a is a rear view of the device of FIG. 17 showing the low profile ribs.

Referring now to FIGS. 13 to 17a there is shown a fourth embodiment where the image sheet 20 moves relative to the lens 21. The image sheet 20 and lens 21 are mounted on the pins 250 as previously described. FIGS. 16 and 16a show how the lens is located with the slot 241 located on the pin 250 as described in the previous embodiment, and a hole 275 in the lens 21 located on the opposite pin 250. The lens 21 is thus aligned with the image sheet 20 as before but fixed due to the pin 250 and hole 275 arrangement. The slots 240 in the image sheet 20 allow the image sheet to move relative to the lens 21 in a direction perpendicular to the lenslets. To each side of the image sheet is located a rotary cam 270 and 271, the position of the cams 270 and 271 determining the position of the image sheet with respect to the lens. The cams 270 and 271 always being out of phase with each other so as not to oppose each other.

In use the image sheet 20 is mounted on the pins 250 between the cams 270 and 271. The lens 21 is also mounted on the pins 250, with the hole 275 engaging the corresponding pin 250, thus preventing the lens from moving. Both image sheet 20 and lens 21 are thus aligned and the front panel 4 positioned as in the third embodiment. To move the image sheet relative to the lens cam 271 is rotated by motorised means so as to engage the edge 273 of the image sheet 20 causing it to move with respect to the lens 21 in a direction perpendicular to the lenslets direction. A stationary viewer is thus presented with a moving image. After a period of time the cam 271 is disengaged and opposite cam 270 is engaged so as to engage edge 272 and return the image sheet 20 to it's starting position. This cycle is repeated as required. The movement of the cams 270 and 271 is determined by controlling means (not shown).

An adjusting means (not shown) may be provided on the pin 250 or lens 21 so as to allow the lens to be positioned with respect to the image sheet so as to be able to determine which image is viewable at the start or end of a cycle.

In this fourth embodiment, while the image sheet 20 is shown as moving relative to the lens 21 it will be appreciated that the opposite may be true, i.e. the image sheet could be fixed and the lens moved relative to it. Also while the cams 270 and 271 are shown as being of simple elliptical shape it will be appreciated that their profile may vary. Also, although two cams 270 and 271 are shown it will be appreciated that any sort of actuator may be used.

Figure 18:
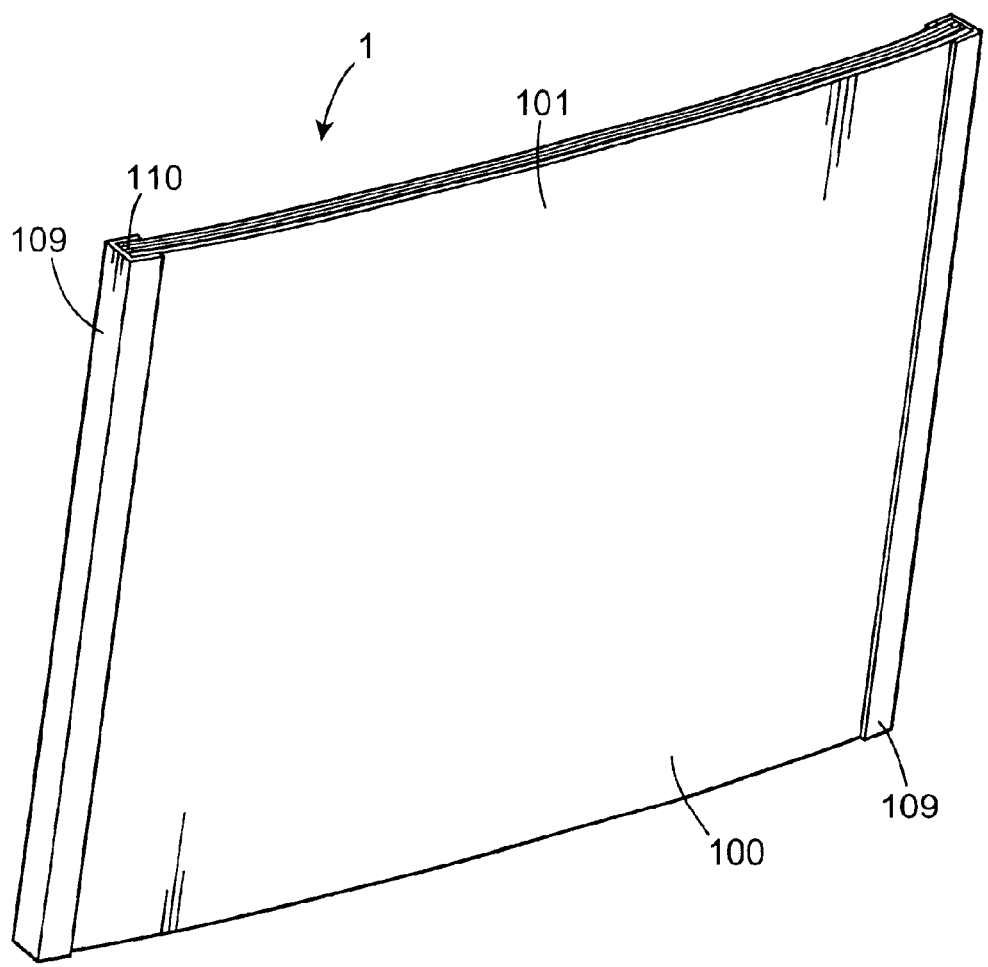
FIG. 18 is a perspective view of a fifth embodiment of the invention.
Figure 19:
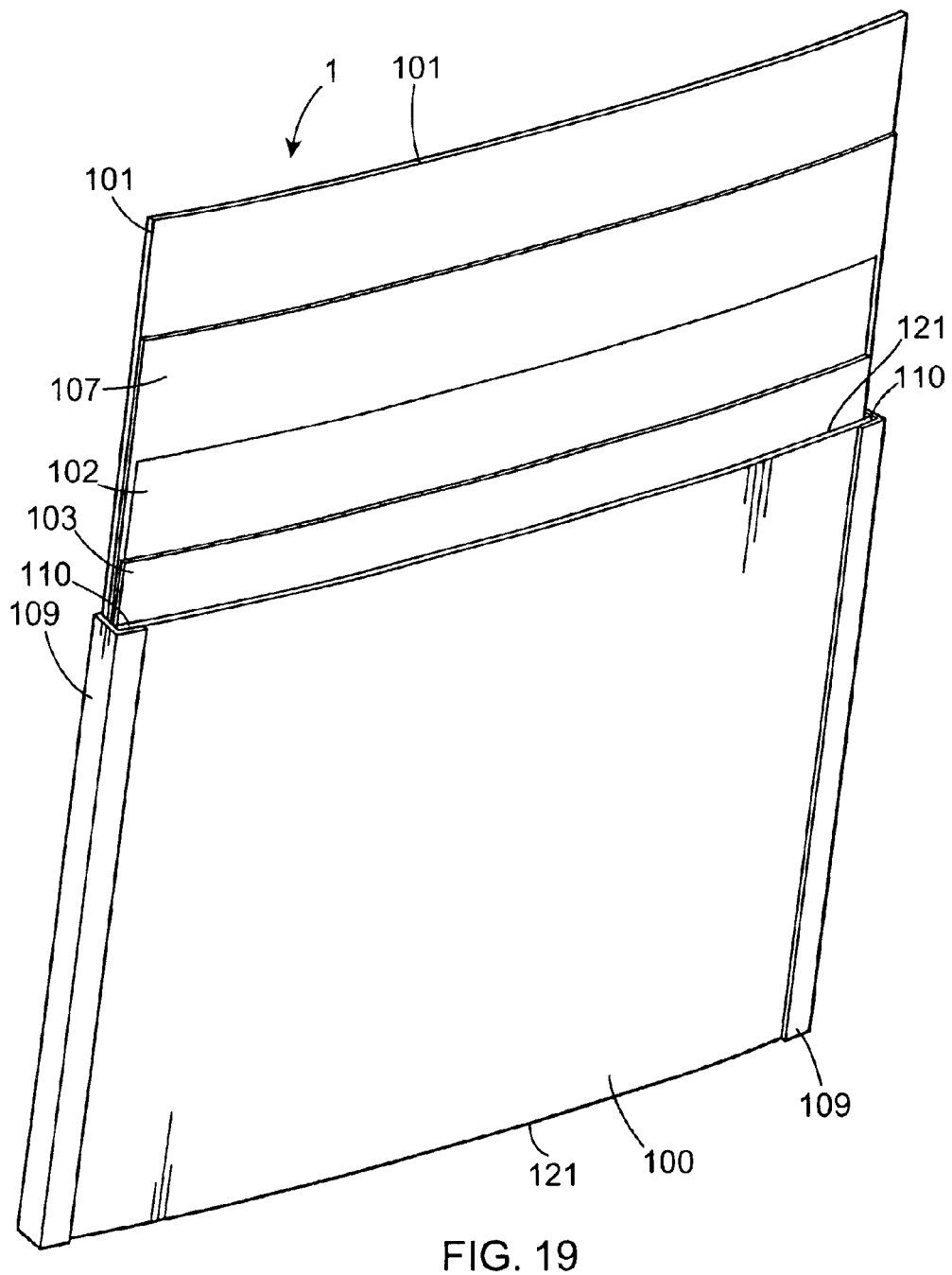
FIG. 19 is a exploded view of FIG. 18.
Figure 20:
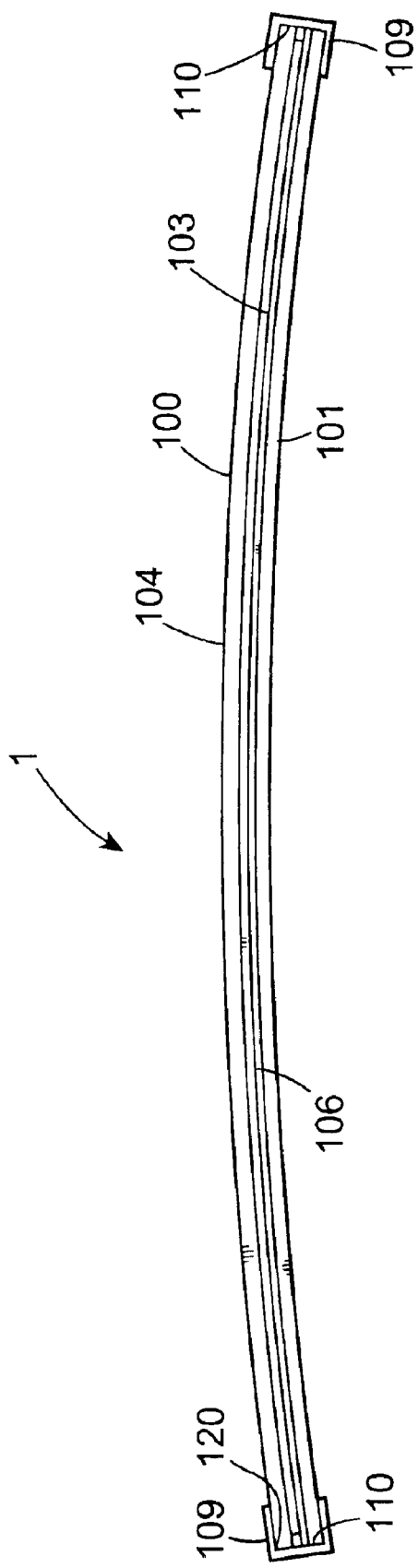
FIG. 20 is an end view of FIG. 18.

Referring now to FIGS. 18 to 20, there is shown an fifth embodiment of the invention. This embodiment is in effect a reversal of the arrangement of the first embodiment. In this embodiment the front panel 100 is of a substantially fixed curvature and a flexible back panel 101 is forced into engagement with the lens and image sheet which are sandwiched between the two panels. In particular, the back panel 101 is maintained under compression, through the application of mutually inwardly-directed tangential forces applied at its edges, to press the image sheet 102 and the lens 103 against the concave rear surface of the front panel 100 so that the lens is maintained in intimate contact with substantially the entire area of the image sheet. The lens 103 is placed with lenslets facing the convex surface 104 of the front panel 100. The image sheet 102 is placed image side 105 against the flat side 106 of the lens 103. Behind the image sheet 102 is placed a separator 107, and finally the back panel 101 is placed behind the separator 107. Securely connected to opposite sides of the front panel 100 is a pair of generally U-cross section retaining members 109. The retaining members 109 having a channel 110 to nominally accommodate the thickness of the front panel 100, back panel 101, image sheet 102, lens 103 and separator 107. The spacing apart of the retaining members 109 along the circumference of the front panel 100 and the length of the back panel 108 are chosen so as to slightly compress the back panel 108 so as it forms a concave shape and compresses the lens 103 and poster 102 between the separator 107 and front panel 100.

The tensioning means in this embodiment is provided by forcing the back panel 101 between the retaining members 109 which have a circumference length nominally shorter than the length of the edge 110 of back panel 101. Alternatively cams or other compressing means may be employed as in the first embodiment so as to compress the back panel 101 when it is in position.

The separator 107 avoids any friction between the poster 102 and the back panel 101 therefore ensuring the poster position is not changed with the insertion of the back panel 101. The image sheet 102 and lens 103 may be aligned as in the third embodiment. The tension between the image sheet and lens should also meet the requirements of the first embodiment as previously stated.

Various modifications to the embodiments are possible.

For example, although cams are used to tension the front panel in the first four embodiments, it will be appreciated that other tensioning means may be used. In particular it is possible to use springs in compression or tension at one or both edges of the panels to apply the necessary tangential forces. Springs may also be used to compress the rear panel in the fifth embodiment. In all cases it is also possible to use other devices such as adjustable bolts, wedges or elastic materials in compression or tension.

Also while in the first four embodiments the front panel 4 has been shown as the member under tension it will be appreciated that the lens 21 may be under direct tension eliminating the requirement for a front panel 4; i.e. the lens 21 may itself constitute the front panel. Similarly, in the fifth embodiment the flexible back panel could be eliminated and the lens be placed under direct compression and serve as the back panel. The image would then be viewed from the rear. In general, any of the described embodiments could be modified to eliminate either one of the panels and use the lens to serve directly as the eliminated panel.

While the image sheet 20 is generally described as being viewable through the front panel 4 it may alternatively be viewed through the back panel 2. Where this is so the ribs 300 (in the embodiments where they are present) may be on the opposite side to the viewing side.

While the back panel 2, where it is the fixed curvature panel, is described as being curved by ribs it will be appreciated that the back panel 2 may be pre-formed into this shape. The curve in the back panel 2 may also be induced by attaching it to a second curved panel. The curve may also be induced by forcing and retaining both straight edges 8 and 60 of the back panel 2 towards each other. In an alternative embodiment of the invention the curve may be induced in the back panel 2 by the side walls of a frame or light box. Also, where curved ribs are used, it will be appreciated that more may be employed; indeed a rib of transparent material may be added in between the ribs described so as to reduce any negative effect on the viewable image when backlighting is employed. Similar considerations to the above apply to the front panel in embodiments where that is the fixed-curvature panel.

The back panel 2 may be of transparent or translucent material and the image sheet of translucent material to allow a light source to illuminate the images from the rear. Alternatively, it will be appreciated that it may alternatively be of an opaque material such as aluminium which has the advantage of being light. To compensate for the lack of transparency thin backlight such as Rexams electroluminescent material may be employed to backlight the image where required.

Also while two actuators are shown, on opposite sides of the moving image sheet one actuator may only be employed with a automatic returning mechanism on the opposite side such as a spring.

While the lens 21 is shown as having it's lenslets parallel to the straight side edges of the back panel it will be appreciated that the lenslets may be orientated perpendicular to the straight edges with, in the case of the fourth embodiment, the cams 270 and 271 correspondingly positioned so as to move the image sheet parallel to the lenslets direction.

In the third and fourth embodiments of the invention, while the lens 20 is held in a particular position by the pin 250 it will be appreciated that other means may be employed such as edge contact against the spacers 209 or indeed a movable stop which may position the lens 21 with respect to the image sheet 20 to determine which particular image may be initially seen from a particular viewing angle, or in the case of the fourth embodiment which image is first seen from a particular viewing angle. While a certain arrangement of slots and locating pins are shown for aligning the lens 21 and image sheet 20 it will be appreciated that any number of slots may be used, and the may not necessarily be placed on opposite edges.

While the image sheet 20 is shown as a single part it may be mounted or laminated to achieve the required stiffness. Where this is employed, the image sheet will be considered to include the mounting substrate and the thickness of the image sheet will be the total thickness of the laminate.

The advantages of the invention are many:

a. By virtue of the construction of the display device the image sheet can readily be removed and replaced with an alternative image sheet having different images thereon eliminating the need for expensive and time consuming laminating and the requirement for a new lens for every new image sheet. For the price of a normal print the image sheet can be changed.

b. Insertion of the image sheet is simple and quick.

c. The simple guide design used in the embodiments allows for the thermal expansion of the lens ensuring continual free movement.

d. The invention makes lenticular technology more affordable for repeat users of lenticular images.

e. The invention allows large properly prepared image sheets to be quickly changed by an unskilled operator.

f. The lens is held in intimate engagement with the image sheet which allows for large images using finer pitch lenses than was previously possible with similar devices. The finer pitch lens allows higher resolution and more frames to be displayed which is essential for good animation, zoom and morph effects. The finer pitch lens also allows for smaller text size.

g. The lens is reusable, therefore reducing the cost of production for lenticular images h. The device may be permanently situated in say a bus shelter allowing for a permanent "lenticular" site which may have multiple image changes at a low cost.

i. The device as described in the embodiments prevents warping of the lens which is a common problem in hot climates.

j. Where two panels are used the device protects the lens from physical damage.

k. The device is compact.

l. In one embodiment the device also allows for stationary viewing of the lenticular image by moving the lens relative to the image sheet.

m. The device is economic to manufacture light and requires little maintenance.

n. A thin, cheaper lens may be employed than could be used in other systems.

The invention is not limited to the embodiments hereinbefore described which may be varied in construction and detail.

What is claimed is:

1. A display device comprising a first panel having a major surface with a substantially fixed curvature, a second panel substantially in register with the first panel and releasably pressed against and into conformity with the said major surface by means applying simultaneous oppositely-directed tangential forces at respective opposite edges of the second panel, and an image sheet sandwiched between the first and second panels, wherein either the device includes a lenticular lens also sandwiched between the panels next to the image sheet or one of the panels is itself a lenticular lens, in either case the lens being maintained in intimate contact with substantially the entire area of the image sheet.

2. A device as claimed in claim 1, wherein the major surface is convex and the tangential forces are directed away from one another to place the second panel under tension.

3. A device as claimed in claim 1, wherein the major surface is concave and the tangential forces are directed towards one another to place the second panel under compression.

4. A device as claimed in claim 1, wherein the force-applying means comprises at least one rotary cam mounted at one edge of one panel and bearing on or adjacent an edge of the other panel.

5. A device as claimed in claim 1, wherein the force-applying means comprises at least one spring at the edge of the panels.

6. A device as claimed in claim 1, wherein one of the image sheet and lens is mounted for reciprocation relative to the other.

7. A device as claimed in claim 1, further including spacing means for maintaining opposite edges of the first and second panels apart by a gap which is substantially the sum of the thicknesses of the image sheet and lens.

* * * * *